(12) United States Patent
Missotten et al.

(10) Patent No.: US 12,408,588 B2
(45) Date of Patent: Sep. 9, 2025

(54) CUTTING APPARATUS

(71) Applicant: CNH Industrial America LLC, New Holland, PA (US)

(72) Inventors: Bart M. A. Missotten, Herent (BE); Pieter Van Overschelde, Sint-Andries (BE); Frederik Tallir, Esen (BE); Dré W. J. Jongmans, AG Klundert (NL); Glenn Aesaert, Izegem (BE)

(73) Assignee: CNH Industrial America LLC, New Holland, PA (US)

( * ) Notice: Subject to any disclaimer, the term of this patent is extended or adjusted under 35 U.S.C. 154(b) by 632 days.

(21) Appl. No.: 17/842,228

(22) Filed: Jun. 16, 2022

(65) Prior Publication Data

US 2022/0400611 A1 Dec. 22, 2022

(30) Foreign Application Priority Data

Jun. 17, 2021 (EP) .................................... 21180161

(51) Int. Cl.
*A01D 34/83* (2006.01)
*A01D 34/13* (2006.01)

(52) U.S. Cl.
CPC ........... *A01D 34/833* (2013.01); *A01D 34/13* (2013.01); *A01D 34/831* (2013.01)

(58) Field of Classification Search
CPC ..... A01D 34/833; A01D 34/831; A01D 34/13
See application file for complete search history.

(56) References Cited

U.S. PATENT DOCUMENTS

| 16,968 A | 4/1857 | Comfort, Jr. |
| 188,788 A | 3/1877 | Farnum |
| 255,688 A | 3/1882 | Spottswood |
| 323,880 A | 8/1885 | Owen |
| 369,096 A | 8/1887 | Brown |
| 490,781 A | 1/1893 | Burkill et al. |
| 490,782 A | 1/1893 | Beekman |

(Continued)

FOREIGN PATENT DOCUMENTS

| CH | 520462 A | 10/1972 |
| CN | 2095534 U | 2/1992 |

(Continued)

OTHER PUBLICATIONS

Farm Show Magazine—Oct. 2, 2018—'The Best Stores About Made-It-Myself Shop Inventions, Farming and Gardening Tips, Time-Saving Tricks & the Best Farm Shop Hacks, DIY Farm Projects, Tips on Boosting Your Farm Income, Time-Saving Farming Advise, Farming Tractors and Agriculture Equipment Reviews.

(Continued)

*Primary Examiner* — Abigail A Risic
(74) *Attorney, Agent, or Firm* — Buchanan Ingersoll & Rooney PC

(57) ABSTRACT

A cutting apparatus for a header of an agricultural harvester includes a first wheel and a second wheel. A drive source is configured to selectively drive the first wheel in a clockwise direction or an anticlockwise direction. A knife carrier, including a loop having a running side and a knife-carrying side, is tensioned around the first and second wheels for transmitting torque from the drive source to rotate the wheels and the knife carrier. A plurality of knives cut crop mounted to the knife-carrying surface of the knife carrier. A sensor monitors operation of the knives.

14 Claims, 4 Drawing Sheets

(56) References Cited

U.S. PATENT DOCUMENTS

| | | |
|---|---|---|
| 598,848 A | 2/1898 | Boice |
| 664,670 A | 12/1900 | Oldham |
| 671,085 A | 4/1901 | Knowles |
| 673,389 A | 5/1901 | Denton |
| 762,104 A | 6/1904 | Teeters et al. |
| 764,567 A | 7/1904 | Ekel |
| 779,994 A | 1/1905 | Downing |
| 840,518 A | 1/1907 | Rodman |
| 957,428 A | 5/1910 | Lithander |
| 1,053,289 A | 2/1913 | Jacobs et al. |
| 1,082,659 A | 12/1913 | Swanson |
| 1,258,671 A | 3/1918 | Greenfield |
| 1,370,352 A | 3/1921 | Parmley |
| 1,623,433 A | 4/1927 | Newton |
| 1,627,644 A | 5/1927 | Hejma |
| 2,063,067 A | 12/1936 | Waller |
| 2,199,642 A | 5/1940 | Maninger |
| 2,282,238 A | 5/1942 | Newton |
| 2,291,182 A | 7/1942 | Blalack |
| 2,304,174 A | 12/1942 | Hurst |
| 2,484,071 A | 10/1949 | Brauer |
| 2,526,821 A | 10/1950 | Jones |
| 2,533,691 A | 12/1950 | Remonte |
| 2,571,811 A | 10/1951 | Andrews |
| 2,619,786 A | 12/1952 | Ream |
| 2,640,309 A | 6/1953 | Benson |
| 2,654,208 A | 10/1953 | Pasturczak |
| 2,767,543 A | 10/1956 | Ream |
| 2,772,533 A | 12/1956 | Shibley, Jr. |
| 2,790,293 A | 4/1957 | Crotty |
| 2,860,477 A | 11/1958 | Chambliss |
| 2,948,099 A | 8/1960 | Johnson |
| 3,029,584 A | 4/1962 | Johnson |
| 3,054,247 A | 9/1962 | Roesler |
| 3,073,100 A | 1/1963 | Kingsley |
| 3,106,053 A | 10/1963 | Fairbairn |
| 3,389,539 A | 6/1968 | Wilhelmus |
| 3,391,522 A | 7/1968 | Zweegers |
| 3,397,524 A | 8/1968 | Hofer et al. |
| 3,401,512 A | 9/1968 | Pool et al. |
| 3,401,513 A | 9/1968 | Pool et al. |
| 3,412,538 A | 11/1968 | Calder |
| 3,431,714 A | 3/1969 | Bouet |
| 3,444,676 A | 5/1969 | Hale et al. |
| 3,455,094 A | 7/1969 | Gorham |
| 3,469,378 A | 9/1969 | Heesters et al. |
| 3,490,214 A | 1/1970 | Cullimore |
| 3,490,215 A | 1/1970 | Chapman et al. |
| 3,507,102 A | 4/1970 | Kline et al. |
| 3,508,388 A | 4/1970 | Buchholz |
| 3,509,704 A | 5/1970 | Tenzman |
| 3,514,934 A | 6/1970 | Cassady |
| 3,517,494 A | 6/1970 | Beusink et al. |
| 3,521,437 A | 7/1970 | Risser et al. |
| 3,538,690 A | 11/1970 | Hinks et al. |
| 3,545,188 A | 12/1970 | Locati |
| 3,550,360 A | 12/1970 | Lely |
| 3,555,798 A | 1/1971 | Eder |
| 3,561,202 A | 2/1971 | Tupper |
| 3,566,592 A | 3/1971 | Jerman et al. |
| 3,572,019 A | 3/1971 | Glunk et al. |
| 3,594,998 A | 7/1971 | Graversen et al. |
| 3,600,880 A | 8/1971 | Woods |
| 3,608,287 A | 9/1971 | Gaertner |
| 3,623,300 A | 11/1971 | König et al. |
| 3,641,751 A | 2/1972 | Locati |
| 3,654,750 A | 4/1972 | van der Lely |
| 3,656,286 A | 4/1972 | Glunk et al. |
| 3,657,868 A | 4/1972 | Cousino |
| 3,662,529 A | 5/1972 | Glunk et al. |
| 3,672,136 A | 6/1972 | Peacock et al. |
| 3,673,779 A | 7/1972 | Scarnato et al. |
| 3,681,901 A | 8/1972 | Buchele et al. |
| 3,698,167 A | 10/1972 | Hurlburt et al. |
| 3,699,757 A | 10/1972 | Hurlburt |
| 3,720,049 A | 3/1973 | Tupper |
| 3,722,195 A | 3/1973 | Hurlburt |
| 3,831,358 A | 8/1974 | Marsh et al. |
| 3,896,611 A | 7/1975 | Lingenfelter et al. |
| 4,070,810 A | 1/1978 | Brakke |
| 4,270,339 A | 6/1981 | Wolfe |
| 4,550,554 A | 11/1985 | Lundahl et al. |
| 4,563,867 A | 1/1986 | Bokon |
| 4,656,819 A | 4/1987 | Pearson |
| 4,719,743 A | 1/1988 | Bokon |
| 4,815,265 A | 3/1989 | Guinn et al. |
| 5,005,342 A | 4/1991 | Lundahl et al. |
| 5,644,904 A | 7/1997 | Olinger |
| 5,732,539 A | 3/1998 | Loftus |
| 5,845,474 A | 12/1998 | Loftus |
| 5,875,624 A | 3/1999 | Olinger |
| 6,446,422 B1 | 9/2002 | Bahr |
| 6,925,790 B1 | 8/2005 | Krone et al. |
| 8,875,481 B2 | 11/2014 | Roberg |
| 9,943,034 B2 | 4/2018 | Kalverkamp et al. |
| 2003/0010009 A1 | 1/2003 | Bickel et al. |
| 2006/0123762 A1 | 6/2006 | Ehlert et al. |
| 2012/0067018 A1 | 3/2012 | Roberg |
| 2021/0045288 A1 | 2/2021 | Sorensen |

FOREIGN PATENT DOCUMENTS

| | | |
|---|---|---|
| CN | 91201617 U | 2/1992 |
| CN | 1200232 A | 12/1998 |
| CN | 2304236 Y | 1/1999 |
| CN | 2312567 Y | 4/1999 |
| CN | 2334153 Y | 8/1999 |
| CN | 1299583 A | 6/2001 |
| CN | 2473874 Y | 1/2002 |
| CN | 2544510 Y | 4/2003 |
| CN | 101151954 A | 4/2008 |
| CN | 201585260 U | 9/2010 |
| CN | 201585261 U | 9/2010 |
| CN | 201601981 U | 10/2010 |
| CN | 201674794 U | 12/2010 |
| CN | 201781776 U | 4/2011 |
| CN | 102067764 A | 5/2011 |
| CN | 102090203 A | 6/2011 |
| CN | 201869561 U | 6/2011 |
| CN | 202197556 U | 4/2012 |
| CN | 102428794 A | 5/2012 |
| CN | 205249809 U | 5/2016 |
| CN | 108093842 A | 6/2018 |
| CZ | 1724 U1 | 4/1994 |
| DE | 1582476 A1 | 6/1970 |
| DE | 2100984 A1 | 12/1971 |
| DE | 2816967 A1 | 10/1979 |
| DE | 3046864 A1 | 7/1982 |
| DE | 3427900 A1 | 1/1986 |
| DE | 3819227 A1 | 12/1989 |
| DE | 3927592 A1 | 2/1991 |
| DE | 19803517 A1 | 8/1999 |
| DE | 102005025319 A1 | 12/2006 |
| DE | 102013106197 A1 | 12/2014 |
| EP | 238827 A1 | 9/1987 |
| EP | 271672 A2 | 6/1988 |
| EP | 299224 A1 | 1/1989 |
| EP | 328080 A2 | 8/1989 |
| EP | 0443079 A2 | 8/1991 |
| EP | 0974255 A1 | 1/2000 |
| EP | 1419688 A1 | 5/2004 |
| EP | 1507451 B1 | 2/2005 |
| EP | 1543713 A1 | 6/2005 |
| EP | 1419688 B1 | 9/2006 |
| EP | 1543713 B1 | 4/2008 |
| EP | 2430900 B1 | 3/2012 |
| EP | 3488681 A1 | 5/2019 |
| FR | 540622 A | 7/1922 |
| FR | 757779 A | 1/1934 |
| FR | 989121 A | 9/1951 |
| FR | 1011968 A | 7/1952 |

(56) References Cited

FOREIGN PATENT DOCUMENTS

| | | |
|---|---|---|
| FR | 1099229 A | 8/1955 |
| FR | 1492261 | 8/1967 |
| FR | 2075464 | 10/1971 |
| GB | 236846 A | 7/1925 |
| GB | 282978 A | 1/1928 |
| GB | 407575 A | 3/1934 |
| GB | 563135 A | 8/1944 |
| GB | 571803 U | 9/1945 |
| GB | 848018 | 9/1960 |
| JP | S52112421 U | 8/1977 |
| JP | S52119430 U | 9/1977 |
| JP | S53102419 U | 8/1978 |
| JP | S57125237 U | 8/1982 |
| JP | S5850621 U | 4/1983 |
| JP | S61125225 U | 8/1986 |
| JP | S6331735 U | 3/1988 |
| JP | H0435721 U | 3/1991 |
| JP | H0399920 U | 10/1991 |
| JP | H05292822 A | 11/1993 |
| JP | H0619420 U | 3/1994 |
| JP | 2000-83440 | 3/2000 |
| JP | 2005-312394 | 11/2005 |
| JP | 2007-43962 | 2/2007 |
| JP | 2008-79540 | 4/2008 |
| JP | 2008-136387 | 6/2008 |
| JP | 2010-4786 | 1/2010 |
| JP | 4484574 B2 | 6/2010 |
| JP | 4861113 B2 | 1/2012 |
| JP | 5290639 | 9/2013 |
| NL | 6515224 | 5/1967 |
| RU | 2299549 C1 | 5/2007 |
| RU | 2461174 C1 | 9/2012 |
| RU | 2478276 C1 | 4/2013 |
| RU | 2565025 C1 | 10/2015 |
| RU | 2609907 C1 | 2/2017 |
| SU | 48419 | 5/1937 |
| SU | 1099888 A | 6/1984 |
| SU | 1130236 A | 12/1984 |
| SU | 1255076 A1 | 9/1986 |
| SU | 1428258 A1 | 10/1988 |
| SU | 1486086 A1 | 6/1989 |
| WO | WO 96/32832 A1 | 10/1996 |
| WO | 200105217 A1 | 1/2001 |
| WO | 200105218 A1 | 1/2001 |

OTHER PUBLICATIONS

"Theoretical and Experimental Analysis of a Continuous Blade Cutting System for Leafy Vegetables" by D. Brown and J. L. Glancey; 2007 Transactions of the ASABE—vol. 50(3): 803-813.
Whatever Happened to Chainsaw-Type Cutterbars? Farm Show Magazine, www.farmshow.com.
Chain-Type Cutterbar—2002—vol. #26, Issue #2, p. 20 (https://www.farmshow.com/a_article.php?aid=15241).
"A Balanced High Speed Rotary Sickle for Cutting and Trajecting Plants" by B. L. Bledsoe and Jay G. Porterfield; Transactions of the ASAE 1971; pp. 818-824.
"A Compound Helical Cutterbar—Design and Field Testing" by W. E. Coates, thesis submitted to the Faculty of the Graduate College of the Oklahoma State University in partial fulfillment of the requirements for the Degree of Doctor of Philosophy, Jul. 1973, 175 pages.
"A Compound Helical Cutterbar—Design and Field Testing" by W. E. Coates and Jay G. Porterfield; Transations of the ASAE 1975, pp. 17-19.
"Elliptical Cutter for Forage Harvesting" by John R. Durfee et al.; Transactions of the ASAE 1977; pp. 635-639.
"Impact Cutting Behaviour of Forage Crops—I. Mathematical Models and Laboratory Tests" by D. M. McRandal and P. B. McNulty; The British Society for Research in Agricultural Engineering 1978; pp. 313-328.
"The Design and Experimental Analysis of a Rotary Sickle for Cutting and Trajecting Plant Stems" by Bobby Lynn Bledsoe Submitted to the Facility of the Graduate College of the Oklahoma State University in Partial Fulfillment of the Requirements for the Degree of Doctor of Philosophy, Aug. 1969.
"Cutting Energy and Force as Required by Pigeon Pea Stems" by Atul R. Dange, S. K. Thakare and I. Bhaskara Rao; Journal of Agricultural Technology 2011 vol. 7(6): 1485-1493 (available at http://www.ijat-aatsea.com).
"Effect of Cutting Speed on Cutting Torque and Cutting Power of Varying Kenaf-Stem Diameters at Different Moisture Contents"; Nov. 2015; ResearchGate; pp. 549-561 (https://www.researchgate.net/publication/28308235).
"Effect of Knife Angle and Velocity on the Energy Required to Cut Cassava Tubers" by R. Visvanathan; V. V. Breenarayanan; K. R. Swaminathan; College of Agricultural Engineering, Tamil Nadu Agricultural University; J. agric. Engng Res. (1996) 64, 99-102.
"Effect of Knife Velocity on Cutting Energy and Efficiency during Impact Cutting of Sorghum Stalk" by Y. D. Yiljep and U.S. Mohammed, Agricultural Engineering International: the CIGR EJournal. Manuscript PM 05 004. vol. VII. Dec. 2005; pp. 1-10.
Extended European Search Report for European Application No. 21 1 801 61.8, dated Dec. 13, 2021, 9 pages.

CUTTING APPARATUS

CROSS-REFERENCE TO RELATED APPLICATION

This application claims priority to European Patent Application No. 21180161.8, filed Jun. 17, 2021, the content of such application being incorporated by reference herein in its entirety.

TECHNICAL FIELD

The present disclosure relates to a cutting apparatus for a header of an agricultural harvester, a header incorporating the cutting apparatus, an agricultural harvester incorporating the header, and to a method of operation of the cutting apparatus.

BACKGROUND

Agricultural harvesters, such as e.g. combine harvesters, include a header that receives, cuts, and gathers crop during harvesting. The header is mounted at the front of the harvester, and is driven towards the crop in order to harvest it. A conventional header includes a frame into which the crop is received, and a sickle cutting bar for cutting the crop ready to be gathered.

The sickle cutting bar comprises a bar from which extends a plurality of cutting knives having a cutting blade on either side. The bar is configured to oscillate a short distance left and right so that the knives are moved leftwards and rightwards in order to provide a cutting action and to cut the crop as it is received into the header.

Unfortunately, the knives are prone to breaking or becoming damaged during operation of the harvester, either due to obstacles in the field colliding with the knives or just due to general wear. Conventionally, the only way to identify a broken knife is the resulting line of unharvested crop extending behind the harvester. The only way to fix the broken knife is to pause harvesting, and replace the knife or, in some cases, the entire sickle bar. This maintenance is far too time-consuming to be practical.

In addition, as the capacity of agricultural harvesters grows and header widths increase, it is becoming more common to drive the harvesters forward faster. The increased forward speed of the harvesters requires a faster cutting oscillation. Moving the knives faster increases the wear on the cutting blades of the knives as well as on the bar itself. Again, there is currently no solution to identifying and rectifying the problem of wear without the costly stoppage of harvesting.

It is an aim of the present invention to address one or more of the disadvantages associated with the prior art.

SUMMARY OF THE INVENTION

According to an aspect of the present invention there is provided a cutting apparatus for a header of an agricultural harvester. The apparatus comprises: a first wheel and a second wheel, both having a drive surface; a drive source configured to selectively drive the first wheel in one of a clockwise direction and an anticlockwise direction; a knife carrier that comprises a loop having a running side and a knife-carrying side, and wherein the loop is tensioned around the first and second wheels so that the running side is engaged by the drive surfaces of the first and second wheels for transmitting torque from the drive source to rotate the wheels and the knife carrier; a plurality of knives for cutting crop, the knives having two cutting blades and being mounted to the knife-carrying surface of the knife carrier; and a sensor for monitoring operation of the knives.

When compared with existing sickle cutting bars, the cutting apparatus described above brings several advantages. One advantage is that the looped knife carrier enables the knives to be moved in a circular motion, so that the knives can be moved continuously in one direction. When the one side of the knives is blunt, the direction can be reversed. By providing a loop, more knives are provided, meaning that the wear on each knife is reduced. Moreover, the loop permits fewer changes of direction because continuous movement in one direction is possible, and this reduces the stresses on the knives and knife carrier. Reducing stresses felt by the knives reduces the risk of knives or of the knife carrier being damaged or broken.

Importantly, because the knife carrier is looped, some knives will be cutting on a cutting side of the apparatus, while other knives will be on the return side of the apparatus and not cutting. The loop therefore permits broken, missing, damaged, or worn knives to be used less and be hidden from the cutting side so that undamaged knives are used to cut the crop. The efficiency of the harvesting can therefore be improved because more of the crop can be cut without pausing to change knives.

In addition, the sensor is important in aiding the control of the knife carrier. By monitoring the operation of the knives, the sensor is able to provide feedback that can be used in controlling the movement of the knife carrier by the drive source, thereby enabling efficient control for optimising the harvest.

The sensor may monitor operation of the knives directly or indirectly. Monitoring the operation of the knives may comprise monitoring the status of the knives. By being suitable for monitoring, the sensor provides output signals based on passive or active measurements that are indicative of the operation of the knives and that can be analysed, using a controller or processor, to determine the operation of the knives, and particularly whether there are knives that are broken, blunt, damaged, or missing.

The sensor may comprise one or more of: an optical sensor; torque sensor; and an inductive sensor.

The first wheel may comprise a first sprocket, the second wheel may comprise a second sprocket, and the loop may comprise a chain. Alternatively, the first wheel may comprise a first pulley, the second wheel may comprise a second pulley, and the knife carrier may comprise a belt.

According to another aspect of the present invention there is provided a header for an agricultural harvester, the header comprising the cutting apparatus described above.

According to another aspect of the present invention there is provided an agricultural harvester comprising the header described above and a controller operatively coupled to the sensor for receiving a signal from the sensor indicative of the operation of the knives and configured to generate a control signal in dependence of the received signal. The controller may be configured to determine one or more missing knives, damaged knives, and/or broken knives based on the received signal. The control signal may be generated based on the determination.

The controller may be operatively coupled to the drive source, and the control signal may comprise a signal for controlling the drive source. Alternatively or additionally, the controller may be operatively coupled to an alert device, and the control signal may comprise a signal for operating the alert device to alert an operator of the agricultural harvester to the received signal.

According to another aspect of the present invention there is provided a method of operating the cutting apparatus described above, wherein the cutting apparatus comprises a cutting side and a return side. The method comprises: receiving, from the sensor, a signal relating to the operation of the knives; determining, based on the received signal, a section of the knife carrier to spend more time on the return side of the cutting apparatus than on the cutting side; and controlling the drive source to oscillate the movement of the knife carrier through a series of oscillations, the series of oscillations comprising a movement of the knife carrier in the clockwise direction and a movement of the knife carrier in the anticlockwise direction, so that the determined section spends more time on the return side of the cutting apparatus than on the cutting side, and wherein the oscillations are varied based on the determined section.

The knife carrier may move a different distance in the clockwise direction than in the anticlockwise direction in at least a portion of the oscillations.

The method may further comprise identifying broken, missing, or worn knives based on the received signal, and determining the section of the knife carrier based on the identified broken, missing, or worn knives.

The method may further comprise, based on the received signal, identifying the section of the knife carrier carrying the most broken knives, and determining the section of the knife carrier to spend more time on the return side based on the identification of identifying the section of the knife carrier carrying the most broken knives.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
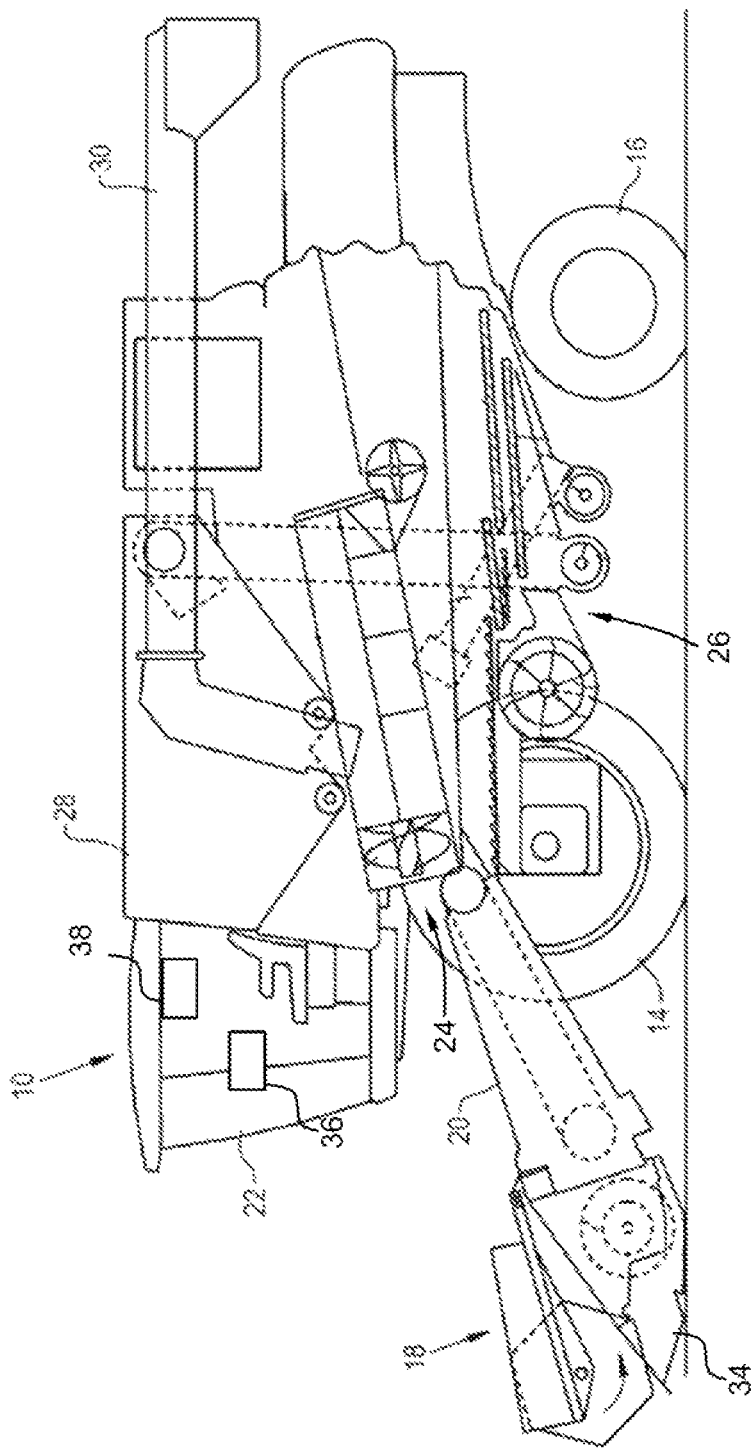
FIG. 1 shows an agricultural harvester in accordance with an embodiment of the invention.

FIG. 1 shows an agricultural harvester in the form of a combine harvester 10, which generally includes front and rear ground-engaging wheels 14, 16, a header 18, a feeder 20, an operator cabin 22, a threshing and separation system 24, a cleaning system 26, a grain tank 28 and an unloading auger 30. It should be appreciated that while the agricultural harvester is shown as a combine harvester 10, the agricultural harvester according to the present invention may be embodied by any construction that allows for crop material to be harvested, such as a conventional combine (which does not have a rotor), rotary combine, hybrid combine, chopper harvester, swath mower etc.

A header 18 is mounted to the front of the combine harvester 10 and includes a cutting apparatus 34 for severing crops from a field during forward motion of the combine. The severed crop is conveyed to the threshing and separating system 24 by a feeder 20, and through a cleaning system 26. In the threshing and separating system 24 and cleaning system, the grain from the severed crop is separated from the 'material other than grain' e.g., straw, leaves, ears and chaff, before. From the cleaning system 26, the grain is conveyed to a grain tank 28 where it can be discharged from the combine harvester by an unloading tube 30.

Returning to the header 18, and more particularly the cutting apparatus 34, the combine harvester 10 also includes a controller 36 for controlling the cutting apparatus, and an alert device 38 mounted in the operator cabin 22 for alerting an operator based on the operation of the cutting apparatus 34. These aspects will be discussed in more detail later.

In general, the cutting apparatus 34 is a set of knives arranged in a loop formation so that the cutting apparatus 34 can be driven continuously in either a clockwise or anticlockwise direction to cut the crop received into the header 18. The cutting apparatus 34 may also be operated through oscillations as required, either to reduce wear to one side of the knives, or to remove certain knives or regions of the apparatus from being used to cut the crop.

Figure 2:
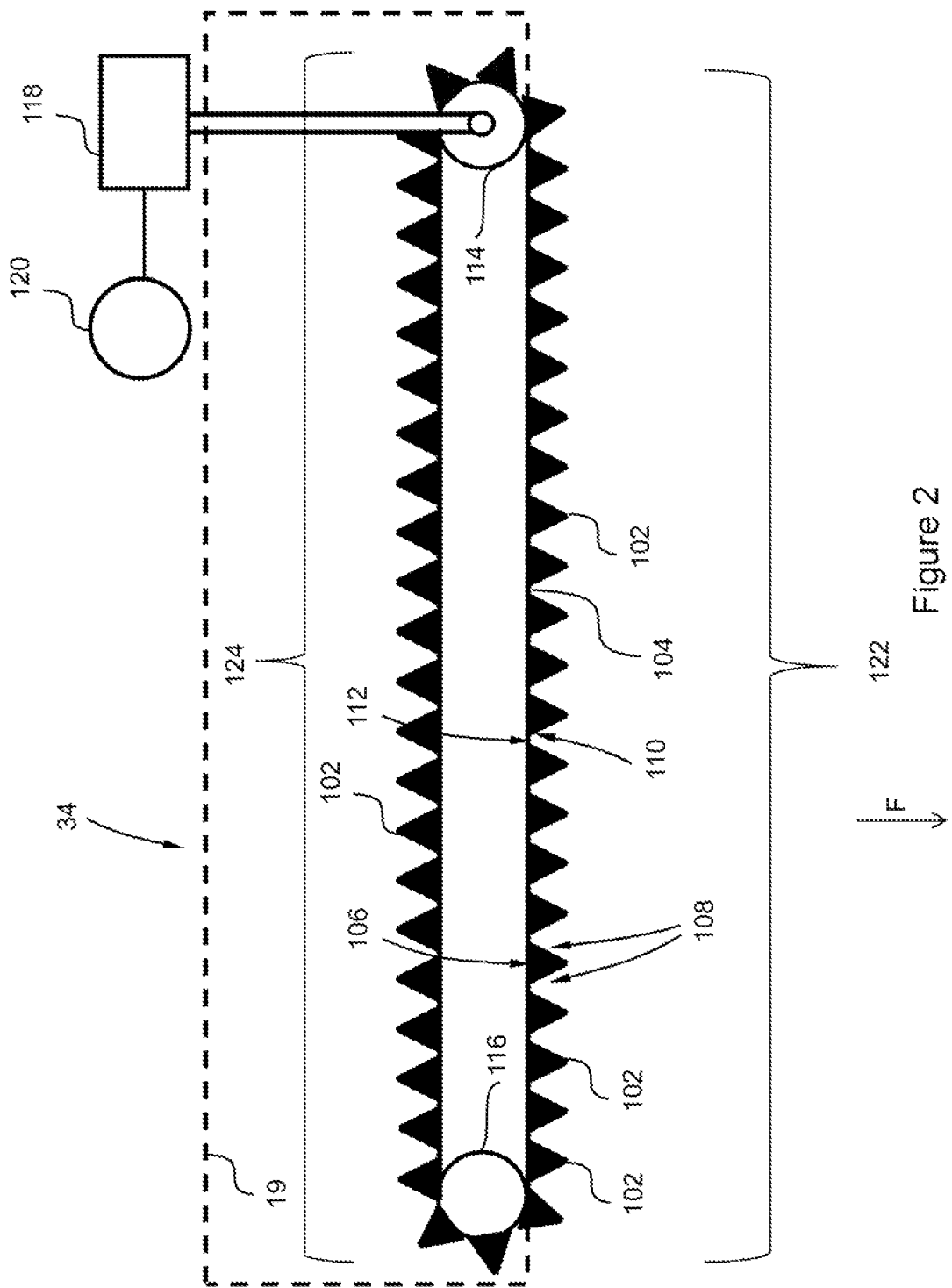
FIG. 2 shows a cutting apparatus in accordance with an embodiment of the invention.

FIG. 2 provides a representation of the cutting apparatus 34. A housing 19 in which the cutting apparatus 34 is provided and which forms part of the header 18 is represented in FIG. 2 by the dotted box.

For the purpose of cutting the crop received by the header, the cutting apparatus 34 comprises a plurality of knives 102 mounted to a knife carrier 104. Each of the knives 102 shown here is generally triangular, and is mounted to the knife carrier 104 at a mounting side 106. The other two sides of the knives 102 extend from the knife carrier 104 and each side has a cutting blade 108 for cutting the crop.

The knives 102 are mounted to the knife carrier 104 which is provided as a loop. The loop has an outer, knife-carrying side 110, from which the knives 102 extend outwardly. The loop also has an inner, running side 112. The loop, which in this example is provided as a belt, is tensioned around two running wheels, which are in the form of a first pulley 114 and second pulley 116 in FIG. 2. Each of the first and second pulleys 114, 116 has a drive surface that engages with the running side 112 of the looped knife carrier 104. Accordingly, torque can be transmitted from the first pulley 114 to the knife carrier 104 when the first pulley 114 is driven, and from the knife carrier 104 to the second pulley 116 to enable smooth rotation of the knife carrier 104, and therefore the knives 102.

In other embodiments, the running wheels comprise first and second sprockets and the loop comprises a chain.

The first pulley 114 is driven by a drive source 118, which may incorporate a DC motor and a gearbox. The drive source 118 is configured to drive the first pulley 114 selectively in a clockwise direction and an anticlockwise direction. The drive source 118 may also include a brake configured to engage to prevent movement of the knife carrier 104. For example, the brake may be used where an obstacle is encountered to prevent any potential damage to the knives.

A sensor 120 is provided for monitoring operation of the knives 102. In FIG. 2, the sensor 120 is a torque sensor configured to monitor operation of the drive source. The torque sensor monitors the torque applied by the drive source to the first pulley 114 in order to drive it. If the torque changes during rotation of the knife carrier, this may be an indication of knife performance changing due to e.g. damage or wear, of knives being broken or missing in part of the knife carrier, or of obstacles in the path of the knives.

Although the sensor 120 is here depicted as a torque sensor, the sensor 120 may also or alternatively comprise: an optical sensor; an acoustic sensor; a vibration sensor; a pressure sensor; a capacitance sensor; a power sensor; and/or an inductive sensor arranged to monitor the knives 102 directly. In these embodiments, an optical or inductive sensor is arranged relative to a position that the knives 102 pass during rotation of the knife carrier 104, so that the wear of the knives 102 or their status, i.e. whether they are broken, missing, or otherwise damaged, can be monitored. For example, the optical sensor may comprise a camera or an optical encoder. An acoustic sensor may comprise a microphone configured to detect uncharacteristic noise from the knives. Uncharacteristic noises may comprise screeching or scratching noises that have a high content of high frequencies. A vibration sensor may comprise one or more accelerometers positioned on the knife carrier and/or the knives. Broken, damaged, or missing knives will cause uncharacteristic vibration that can be identified based on analysis of a signal from an accelerometer. A pressure sensor may be arranged to determine pressure within a hydraulic drive line if a hydraulic motor is used to drive the knife carrier. A power sensor may be combined with an electric motor to monitor the power provided by the motor to the knife carrier.

When provided in the agricultural harvester 10, the drive source 118 is configured to be controlled according to control signals received from the controller 36. The sensor 120 is configured to monitor the operation of the knives 102 and to provide signals indicative of the operation of the knives 102 to the controller 36.

The controller 36 is a general input-output processing system configured to receive inputs from the sensor 120 and to output control and command signals to the drive source 118. The controller 36 may be the general controller for the harvester 10 and so may receive inputs and dispatch outputs other than those used for controlling the cutting apparatus 34. Alternatively, the controller 36 may be a standalone controller.

As will be well understood by the skilled person, the controller 36 may connect to one or more user interfaces to permit input of user controls, as well as output devices to return information to the user. An example of an output device for communicating pertinent information to the user that the controller 36 may be connected to is the alert device 38. The alert device 38 may be a display and/or audio device provided in the operator cabin 22 configured to provide visual and auditory notification and warning to the operator of the harvester 10 based on determinations made by and inputs received by the controller 36. The controller 36 may alternatively or additionally be connected to an alert device 38 remote from the harvester 10 via a communications network.

In operation, the cutting apparatus 34 can be considered to have a cutting section 122 and a return section 124. The cutting section 122 is exposed, in use, to enable the knives 102 to cut crop received into the housing 19 as they pass along the cutting section 122 by movement of the knife carrier 104. The knives 102 exit the cutting section 122 and pass into the return section 124, behind and to the sides of the cutting section 122, where the knives 102 are not exposed, and are housed so that no cutting is possible.

In FIG. 2, the cutting section 122 is the part not within the dotted box representing the housing 19. It is noted that the forward direction of travel of the harvester 10 in this configuration would be downwardly relative to the page, in the direction of the arrow F. Accordingly, the return section 124 is the part of the cutting apparatus 34 where knives 102 are in the dotted box.

The cutting apparatus 34 is operable in a number of different ways depending upon how the knives 102 are to be handled and upon the operation and state of the knives 102. For example, in some circumstances, the aim during operation of the cutting apparatus 34 may be to reduce wear on some or all of the knives 102. In other circumstances, the aim may be to remove from use one or more knives 102 or points where knives are missing by keeping these parts of the knife carrier 104 and the knives 102 thereon within the return section 124. Particular examples are discussed below with reference to FIGS. 3 to 4*b*.

Figure 3:
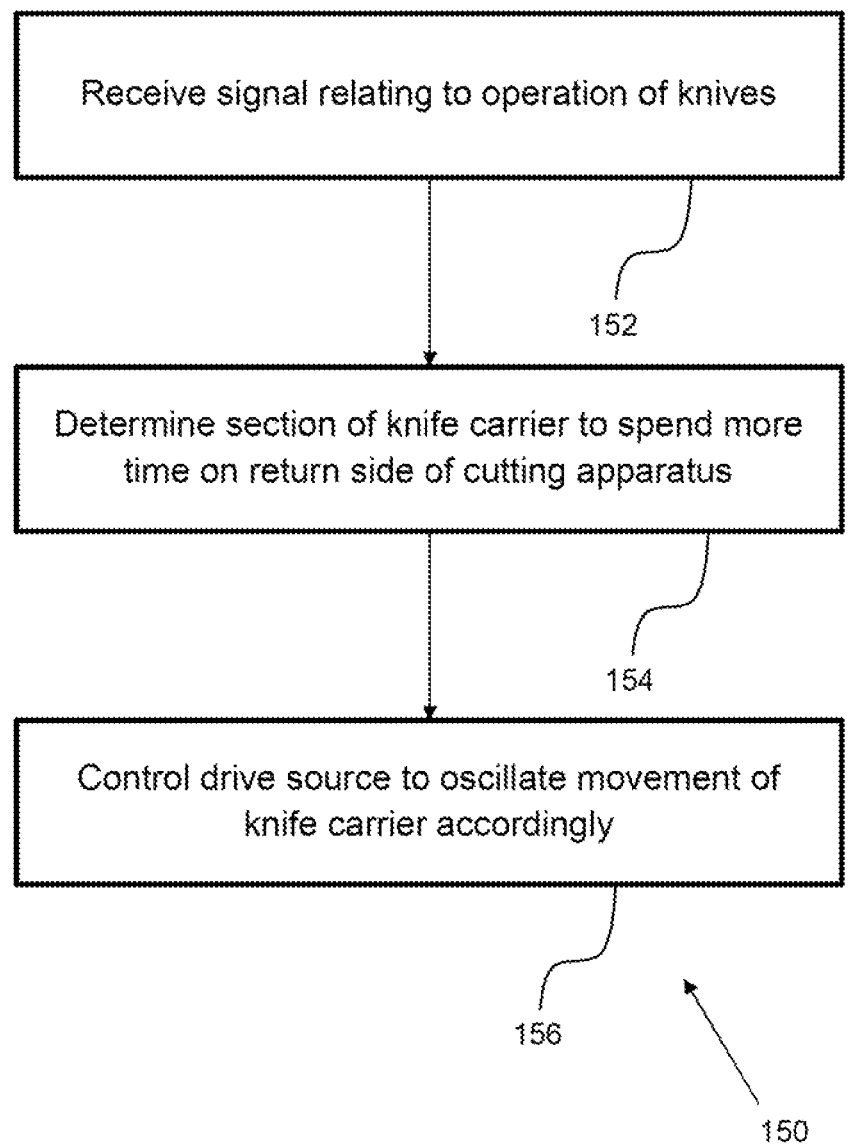
FIG. 3 shows a flow chart governing operation of the cutting apparatus of FIG. 2.

A general method 150 of operation of the cutting apparatus 34 is provided in FIG. 3. The method 150 may be performed by the controller 36. The method 150 includes, at step 150, receiving a signal relating to the operation of the knives 102. The signal is received from the sensor 120 of the cutting apparatus 34. The type of signal depends on the type of sensor 120 used. For example, the signal may comprise a torque signal if the sensor is a torque sensor. The torque sensor can be based on a direct force/torque measurement, an indirect measurement, like a strain measurement or on measurement of the acceleration/deceleration based on the change in rotation/speed.

At step 154, the method 150 includes determining a section of the knife carrier 104 to spend more time on the return side 124 of the cutting apparatus 34 than on the cutting side, based on the received signal from the sensor 120. In other words, this step 154 is identifying knives 102 that should not be used or should be used for cutting the crop less than the other knives of the cutting apparatus 34.

Figure 4A:
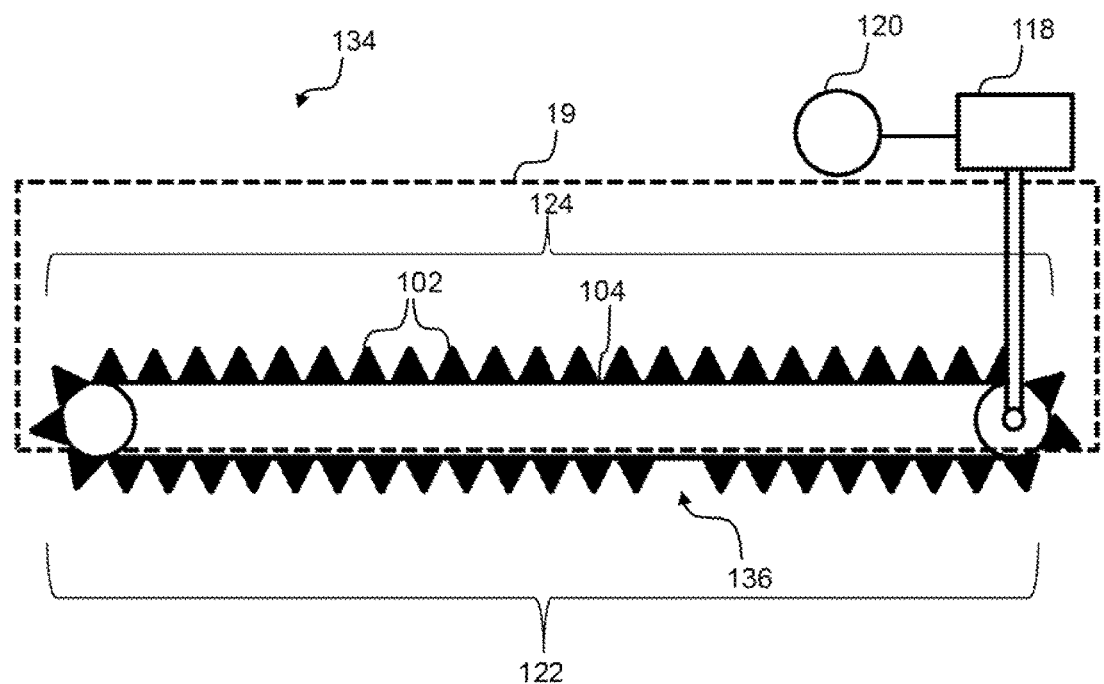
FIGS. 4a and 4b each show a cutting apparatus with a missing knife.

There may be a number of reasons for identifying knives 102 for using less and spending more time on the rear section 124. For example, one or more of the knives of the plurality of knives 102 may have excessive wear on their blades 108 that leads to inefficient cutting when compared to other knives in the plurality of knives 102 carried by the carrier 104. In another example, the aim may be to balance the wear to all knives 102, and so knives that have already been used may be identified for less use. In other examples, one or more of the knives may be damaged, broken, or even missing altogether from the sequence of knives. An example of a cutting apparatus 134 with a missing knife 136 is shown in FIG. 4*a*. All features other than the missing knife 136 are the same in FIG. 4*a* and so have been labelled with the same reference numerals as FIG. 2. The missing knife 136 in FIG. 4*a* is in the cutting section 122.

To identify a section of the knife carrier 104 that should be moved to and spend more time in the return section 124, the signal received from the sensor 120 may be interpreted and analysed. The analysis may be used to identify or determine various properties of the knives 102 and cutting apparatus 34, from which the section of the knife carrier 104 can be determined.

In particular, although not shown in FIG. 3, the method 150 may comprise identifying broken, missing, or worn knives based on the received signal, and determining the section of the knife carrier 104 based on the identified broken, missing, or worn knives. If more than one part of the knife carrier 104 has broken, worn, or missing knives, the method may comprise identifying the section of the knife carrier 104 carrying the most broken knives, and determining the section of the knife carrier 104 to spend more time on the return side 124 based on the identification of identifying the section of the knife carrier 104 carrying the most broken knives. Accordingly, in both cases, the most effective part of the knife carrier 104 for cutting is identified.

Returning to the method 150 of FIG. 3, after the section of the knife carrier that is to spend more time on the return side of the cutting apparatus has been determined, step 156 of the method 150 is to control the drive source 118 to move the knife carrier 104 accordingly. In this step, the drive source is controlled to oscillate the movement of the knife carrier through a series of oscillations, the series of oscillations comprising a movement of the knife carrier in the clockwise direction and a movement of the knife carrier in the anticlockwise direction, so that the determined section spends more time on the return side of the cutting apparatus than on the cutting side. The oscillations are varied based on the determined section.

Figure 4B:
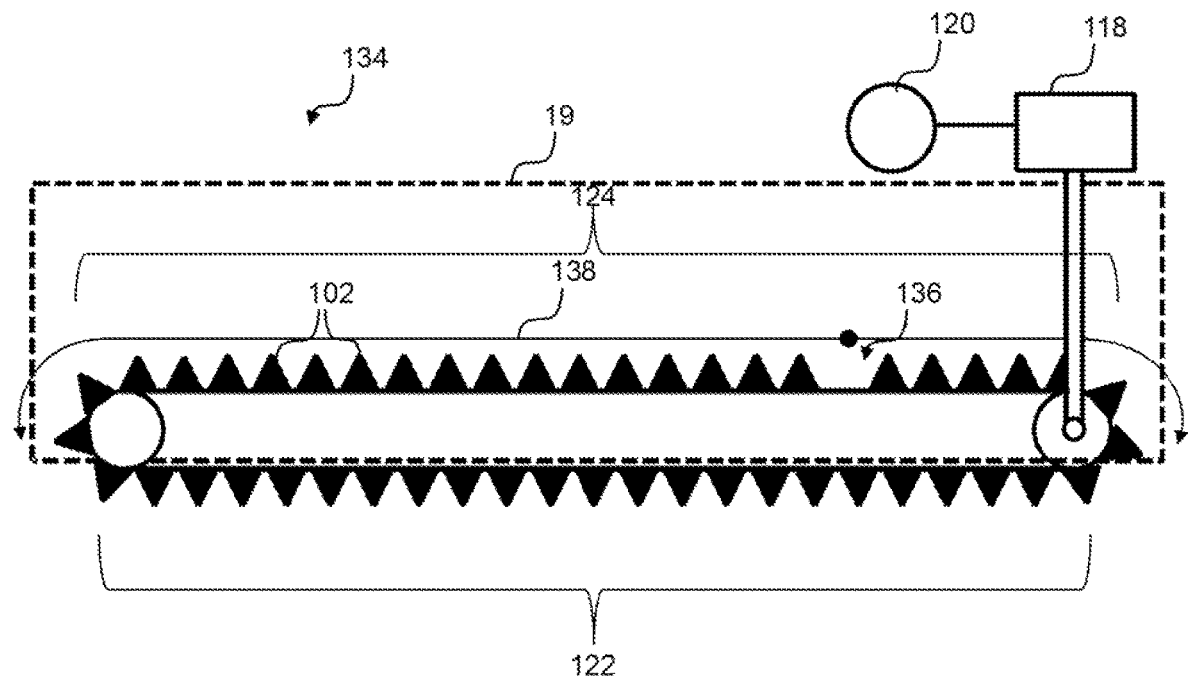

When applying this method to the cutting apparatus 34 shown in FIG. 4a, the sensor 120 provides torque measurements as the missing knife moves through the cutting section 122. The torque measurements are indicative of a missing knife 136, and so the method, at step 154 identifies a missing knife 136, and determines the section of the knife carrier in which that missing knife 136 is found. This is the section that is to spend more time in the return section of the cutting apparatus 34. Accordingly, the drive source 118 is controlled to move the knife carrier 104 so that the section with the missing knife 136 is at the return section 124 and is not used in the cutting region 122, as illustrated in FIG. 4b. During subsequent operation, the drive source 118 is controlled to oscillate the knife carrier 104 in the clockwise and anticlockwise directions while maintaining the missing knife 136 in the return section 124, as indicated by the arrow 138 in FIG. 4b.

In some embodiments of the control method, some or all of the oscillations may be asymmetric oscillations, by which it is meant that the knife carrier moves a different distance in the clockwise direction than in the anticlockwise direction. Asymmetrical oscillations in cutting provide an efficient cutting action while ensuring that the entire usable section of the knife carrier is used.

In some embodiments, the sensor 120 may monitor the operation of the cutting apparatus in general in order to ensure that the knife carrier, pulleys, and drive source are well maintained and functioning correctly. Changes in torque of the drive source may be an indication of a change in the tension of the knife carrier, and so may indicate a problem that requires rectification. A control method may be provided to identify problems with the knife carrier, pulley, or drive source and to notify the operator of the harvester accordingly.

In some embodiments, the harvester may be provided with a sharpening device and/or a cleaning device for maintaining the knives. The sharpening and/or cleaning devices may be controlled by the controller to sharpen and clean the knives either during operation of the cutting apparatus or during periods when the cutting apparatus is not operating to cut the crop. The sharpening device and/or cleaning device may be positioned to sharpen and clean respectively in the return section of the knife carrier.

It will be appreciated that various changes and modifications can be made to the present invention without departing from the scope of the present application.

What is claimed is:

1. A cutting apparatus for a header of an agricultural harvester, the apparatus comprising:
   a first wheel and a second wheel, each wheel having a drive surface;
   a drive source configured to selectively drive the first wheel in one of a clockwise direction and an anticlockwise direction;
   a knife carrier that comprises a loop having a running side and a knife-carrying side, and wherein the loop is tensioned around the first and second wheels so that the running side is engaged by the drive surfaces of the first and second wheels for transmitting torque from the drive source to rotate the wheels and the knife carrier;
   a plurality of knives for cutting crop, the knives having two cutting blades and being mounted to the knife-carrying side of the knife carrier;
   a sensor for monitoring operation of the knives; and
   a controller that is operatively connected to the sensor and the drive source, wherein the controller is configured to:
      receive, from the sensor, a signal relating to operation of the knives; and
      determine, based on the received signal, a section of the knife carrier to spend more time on a return side of the cutting apparatus than on a cutting side of the cutting apparatus.

2. The cutting apparatus of claim 1, wherein the sensor comprises one or more of:
   an optical sensor; a torque sensor; an acoustic sensor; a vibration sensor; and an inductive sensor.

3. The cutting apparatus of claim 1, wherein the first wheel comprises a first sprocket, the second wheel comprises a second sprocket, and the loop comprises a chain.

4. The cutting apparatus of claim 1, wherein the first wheel comprises a first pulley, the second wheel comprises a second pulley, and the loop comprises a belt.

5. A header for an agricultural harvester, the header comprising the cutting apparatus of claim 1.

6. An agricultural harvester comprising:
   the header of claim 5; and
   the controller being operatively coupled to the sensor for receiving a signal from the sensor indicative of the operation of the knives and configured to generate a control signal in dependence of the received signal.

7. The agricultural harvester of claim 6, wherein the control signal comprises a signal for controlling the drive source.

8. The agricultural harvester of claim 6, wherein the controller is operatively coupled to an alert device, and wherein the control signal comprises a signal for operating the alert device to alert an operator of the agricultural harvester to the received signal.

9. In a cutting apparatus for a header of an agricultural harvester, the apparatus including (i) a first wheel and a second wheel, each wheel having a drive surface; (ii) a drive source configured to selectively drive the first wheel; (iii) a knife carrier that comprises a loop having a running side and a knife-carrying side, and wherein the loop is tensioned around the first and second wheels so that the running side is engaged by the drive surfaces of the first and second wheels for transmitting torque from the drive source to rotate the wheels and the knife carrier; (iv) a plurality of knives for cutting crop, the knives having two cutting blades and being mounted to the knife-carrying side of the knife carrier; and (v) a sensor for monitoring operation of the knives, a method of operating the cutting apparatus comprises:

receiving, from the sensor, a signal relating to operation of the knives;

determining, based on the received signal, a section of the knife carrier to spend more time on a return side of the cutting apparatus than on a cutting side of the cutting apparatus;

controlling the drive source to oscillate the movement of the knife carrier through a series of oscillations, the series of oscillations comprising a movement of the knife carrier in a clockwise direction and a movement of the knife carrier in an anticlockwise direction, so that the determined section of the knife carrier spends more time on the return side of the cutting apparatus than on the cutting side.

10. The method of claim 9, wherein, in at least a portion of the oscillations, the knife carrier moves a different distance in the clockwise direction than in the anticlockwise direction.

11. The method of claim 9, further comprising identifying broken, missing, or worn knives based on the received signal, and determining the section of the knife carrier to spend more time on the return side of the cutting apparatus than on the cutting side based on the identified broken, missing, or worn knives.

12. The method of claim 11, further comprising, based on the received signal, identifying the section of the knife carrier carrying the most broken, missing, or worn knives, and determining the section of the knife carrier to spend more time on the return side of the cutting apparatus than on the cutting side based on the identified section of the knife carrier carrying the most broken, missing, or worn knives.

13. A cutting apparatus for a header of an agricultural harvester, the apparatus comprising:

a first wheel and a second wheel, each wheel having a drive surface;

a drive source configured to selectively drive the first wheel in one of a clockwise direction and an anticlockwise direction;

a knife carrier that comprises a loop having a running side and a knife-carrying side, and wherein the loop is tensioned around the first and second wheels so that the running side is engaged by the drive surfaces of the first and second wheels for transmitting torque from the drive source to rotate the wheels and the knife carrier;

a plurality of knives for cutting crop, the knives having two cutting blades and being mounted to the knife-carrying side of the knife carrier; and a sensor for monitoring operation of the knives, wherein the sensor is a torque sensor that is configured to monitor a torque applied by the drive source onto the first wheel, wherein changes in the monitored torque are indicative of operation of the knives.

14. The cutting apparatus of claim 1, wherein the controller is further configured to control the drive source to oscillate the movement of the knife carrier through a series of oscillations, the series of oscillations comprising a movement of the knife carrier in a clockwise direction and a movement of the knife carrier in an anticlockwise direction, so that the determined section of the knife carrier spends more time on the return side of the cutting apparatus than on the cutting side.

* * * * *